United States Patent
Choi et al.

(10) Patent No.: US 12,322,523 B2
(45) Date of Patent: Jun. 3, 2025

(54) CONDUCTIVE RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Gi Dae Choi, Daejeon (KR); Jinseon Kim, Daejeon (KR); Myong Jo Ham, Daejeon (KR); Hyun Jin Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 604 days.

(21) Appl. No.: 17/630,867

(22) PCT Filed: Jul. 8, 2021

(86) PCT No.: PCT/KR2021/008685
§ 371 (c)(1),
(2) Date: Jan. 27, 2022

(87) PCT Pub. No.: WO2022/030773
PCT Pub. Date: Feb. 10, 2022

(65) Prior Publication Data
US 2022/0356343 A1 Nov. 10, 2022

(30) Foreign Application Priority Data

Aug. 4, 2020 (KR) .................. 10-2020-0097100
Jul. 7, 2021 (KR) .................. 10-2021-0088799

(51) Int. Cl.
*H01B 1/24* (2006.01)
*C08J 3/20* (2006.01)
*C08L 67/02* (2006.01)

(52) U.S. Cl.
CPC .............. *H01B 1/24* (2013.01); *C08J 3/203* (2013.01); *C08L 67/02* (2013.01); *C08J 2367/02* (2013.01);
(Continued)

(58) Field of Classification Search
CPC .......... C08L 67/02; C08L 71/12; C08L 53/02; C08K 3/041; C08K 3/046; C08K 3/40
See application file for complete search history.

(56) References Cited

U.S. PATENT DOCUMENTS 4,610,808 A * 9/1986 Kleiner .................... C08K 3/08
252/512
6,221,283 B1 4/2001 Dharmarajan et al.
(Continued)

FOREIGN PATENT DOCUMENTS

CN 106566267 A 4/2017
CN 106817903 A 6/2017
(Continued)

*Primary Examiner* — Katie L. Hammer
(74) *Attorney, Agent, or Firm* — Bryan Cave Leighton Paisner LLP

(57) ABSTRACT

A conductive resin composition including 100 parts by weight of a base resin (A), which includes a polyester, a polyarylene ether, and an aromatic elastomer; 3 to 12 parts by weight of two or more polyfunctional reaction agents (B); 0.1 to 3 parts by weight of carbon nanotubes (C); 0.1 to 5 parts by weight of carbon nanoplates (D); and 1 to 10 parts by weight of glass powder (E), a method of preparing the conductive resin composition, and a molded article including the conductive resin composition. The conductive resin composition has excellent moisture stability and heat resistance in addition to excellent appearance, rigidity, and conductivity; can minimize the influence of moisture and heat when exposed to external environments; and thus, can be used in exterior parts to replace metal parts used in automobiles.

11 Claims, 1 Drawing Sheet

(52) U.S. Cl.
CPC ........ *C08J 2409/06* (2013.01); *C08J 2463/00* (2013.01); *C08J 2471/12* (2013.01); *C08J 2477/06* (2013.01); *C08L 2203/20* (2013.01); *C08L 2205/025* (2013.01); *C08L 2205/035* (2013.01)

(56) References Cited

U.S. PATENT DOCUMENTS

| | | |
|---|---|---|
| 6,352,654 B1 | 3/2002 | Silvi et al. |
| 10,125,243 B2 | 11/2018 | Korzhenko et al. |
| 2015/0187457 A1 | 7/2015 | Hong et al. |
| 2016/0046794 A1* | 2/2016 | Choi ........................ C08K 5/22 524/391 |

FOREIGN PATENT DOCUMENTS

| | | |
|---|---|---|
| EP | 1736512 A1 | 12/2006 |
| EP | 2463341 A1 | 6/2012 |
| JP | 2004-002898 A | 1/2004 |
| JP | 2004-519549 A | 7/2004 |
| JP | 2005-508425 A | 3/2005 |
| JP | 2010-043265 A | 2/2010 |
| JP | 5605364 B2 | 10/2014 |
| KR | 10-2010-0100153 A | 9/2010 |
| KR | 10-2014-0102527 A | 8/2014 |
| KR | 10-2015-0058883 A | 5/2015 |
| KR | 10-2015-0078241 A | 7/2015 |
| KR | 10-2019-0030507 A | 3/2019 |
| KR | 10-2019-0071895 A | 6/2019 |
| KR | 10-2125262 B1 | 6/2020 |
| WO | 2005-026260 A1 | 11/2007 |

* cited by examiner

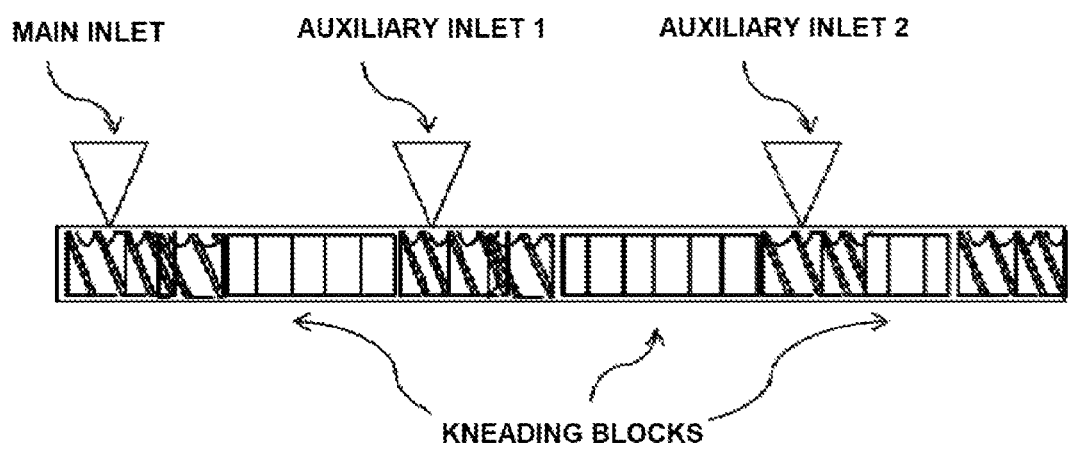

US 12,322,523 B2

CONDUCTIVE RESIN COMPOSITION, METHOD OF PREPARING THE SAME, AND MOLDED ARTICLE INCLUDING THE SAME

CROSS-REFERENCE TO RELATED APPLICATIONS

This application is a U.S. national phase of international application No. PCT/KR2021/008685 filed on Jul. 8, 2021, and claims priority to Korean Patent Application No. 10-2020-0097100, filed on Aug. 4, 2020, and Korean Patent Application No. 10-2021-0088799, filed on Jul. 7, 2021, in the Korean Intellectual Property Office, the disclosures of each of which are incorporated by reference as if fully set forth herein.

TECHNICAL FIELD

The present invention relates to a conductive resin composition, a method of preparing the same, and a molded article including the same. More particularly, the present invention relates to a conductive resin composition: having excellent moisture stability and heat resistance in addition to excellent appearance, rigidity, and conductivity; capable of minimizing the influence of moisture and heat when exposed to external environments due to these properties; and thus, suitable for exterior parts replacing metal parts used in automobiles, a method of preparing the conductive resin composition, and a molded article including the conductive resin composition.

BACKGROUND

In recent years, attempts have been made to manufacture automotive exterior parts using resins to improve fuel efficiency of automobiles. In particular, a blended resin of polyphenylene ether and a polyamide is widely used as a material for automobile exterior parts.

The blended resin is a resin prepared for the purpose of combining the excellent heat resistance and impact resistance of polyphenylene ether with the excellent solvent resistance of a polyamide. However, the blended resin does not have sufficient heat resistance due to poor compatibility.

In general, automotive exterior parts require coating, and electrostatic coating is mainly used in consideration of environmental effects, reduction of total volatile organic compounds (TVOCs), and appearance. To improve the efficiency of electrostatic coating, attempts have been made to impart conductivity to the blended resin by adding a conductive material such as carbon fiber or carbon black. However, addition of a conductive material results in a deterioration of appearance and reduction in impact resistance.

U.S. Pat. No. 6,221,283 describes a technique for improving the conductivity of a conductive resin by including a continuous phase polyamide, a compatibilizer, and a conductivity imparting agent; Japanese Patent No. 3565836 describes a method of preparing a resin composition with improved fluidity and impact resistance by including polyphenylene ether, a polyamide, and carbon black; and U.S. Pat. No. 6,352,654 discloses a conductive resin composition prepared by mixing a polyphenylene ether-polyamide blended resin and conductive carbon black to improve adhesion and ductility of a paint to the blended resin.

However, such a blended resin may be limited in its ability to improve heat resistance. In addition, when a molded product is manufactured using a blended resin, pinholes may be generated on the surface of the molded product, and thus, appearance may deteriorate. In addition, mechanical properties or dimensional stability may deteriorate because of moisture.

Therefore, there is increasing demand for development of a conductive resin composition having excellent appearance, mechanical properties, and conductivity, which is capable of minimizing the influence of moisture and heat when exposed to external environments, and thus, being applicable to automotive exterior parts.

RELATED ART DOCUMENTS

U.S. Pat. No. 6,221,283
(Japanese Patent No. 3565836
U.S. Pat. No. 6,352,654

SUMMARY

The present invention has been made in view of the above problems, and it is an objective of the present invention to provide a conductive resin composition having excellent moisture stability and heat resistance in addition to excellent appearance, rigidity, and conductivity; being capable of minimizing the influence of moisture and heat when exposed to external environments due to these properties; and thus, suitable for use in exterior parts as a replacement for metal parts used in automobiles; a method of preparing the conductive resin composition; and a molded article including the conductive resin composition.

The above and other objects can be accomplished by the present invention described below.

In accordance with one aspect of the present invention, provided is a conductive resin composition including 100 parts by weight of a base resin (A), which includes a polyester, a polyarylene ether, and an aromatic elastomer; 3 to 12 parts by weight of two or more polyfunctional reaction agents (B); 0.1 to 3 parts by weight of carbon nanotubes (C); 0.1 to 5 parts by weight of carbon nanoplates (D); and 1 to 10 parts by weight of glass powder (E).

In accordance with another aspect of the present invention, provided is a conductive resin composition including 100 parts by weight of a base resin (A), which includes a polyester, a polyarylene ether, and an aromatic elastomer; 3 to 12 parts by weight of two or more polyfunctional reaction agents (B); 0.1 to 3 parts by weight of carbon nanotubes (C); and 0.1 to 5 parts by weight of carbon nanoplates (D), wherein the conductive resin composition has a water absorption rate of 0.1% or less.

In accordance with still another aspect of the present invention, provided is a method of preparing a conductive resin composition, the method including kneading and extruding 100 parts by weight of a base resin (A), which includes a polyester, a polyarylene ether, and an aromatic elastomer; 3 to 12 parts by weight of two or more polyfunctional reaction agents (B); 0.1 to 3 parts by weight of carbon nanotubes (C); 0.1 to 5 parts by weight of carbon nanoplates (D) ; and 1 to 7 parts by weight of glass powder (E), wherein the kneading and extrusion are performed using an extruder equipped with 9 or more kneading blocks.

In accordance with still another aspect of the present invention, provided is a method of preparing a conductive resin composition, the method including kneading and extruding 100 parts by weight of a base resin (A), which includes a polyester, a polyarylene ether, and an aromatic elastomer; 3 to 12 parts by weight of two or more polyfunctional reaction agents (B); 0.1 to 3 parts by weight of carbon nanotubes (C); and 0.1 to 5 parts by weight of carbon nanoplates (D), wherein the kneading and extrusion are performed using an extruder equipped with 9 or more kneading blocks, and the conductive resin composition has a water absorption rate of 0.1% or less.

In accordance with yet another aspect of the present invention, provided is a molded article including the conductive resin composition. The present invention is directed to a conductive resin composition: having excellent moisture stability and heat resistance in addition to excellent appearance, rigidity, and conductivity; capable of minimizing the influence of moisture and heat when exposed to external environments due to these properties; and thus, suitable for use as exterior parts to replace metal parts used in automobiles, a method of preparing the conductive resin composition, and a molded article including the conductive resin composition.

BRIEF DESCRIPTION OF DRAWING

The FIGURE is a schematic illustration of an extruder equipped with 9 or more kneading blocks, which is used in the preparation of the conductive resin composition of the present invention.

DETAILED DESCRIPTION

Hereinafter, a conductive resin composition, a method of preparing the same, and a molded article including the same according the present invention will be described in detail.

As described in this application, when a conductive resin composition was prepared by mixing a base resin including a polyester, a polyarylene ether, and an aromatic elastomer; two or more polyfunctional reaction agents; carbon nanotubes having a predetermined BET surface area; plate-shaped carbon nanoplates; and spherical glass powder in a predetermined composition ratio and a molded article was manufactured using the conductive resin composition, the molded article had excellent appearance, rigidity, and conductivity, and was hardly affected by moisture and heat when exposed to external environments. Based on these results, the present inventors conducted further studies to complete the present invention.

The conductive resin composition of the present invention includes 100 parts by weight of a base resin (A), which includes a polyester, a polyarylene ether, and an aromatic elastomer; 3 to 12 parts by weight of two or more polyfunctional reaction agents (B); 0.1 to 3 parts by weight of carbon nanotubes (C); 0.1 to 5 parts by weight of carbon nanoplates (D); and 1 to 10 parts by weight of glass powder (E). In this case, the conductive resin composition has excellent moisture stability and heat resistance in addition to excellent appearance, rigidity, and conductivity, is capable of minimizing the influence of moisture and heat when exposed to external environments, and thus, can be used in exterior parts to replace metal parts used in automobiles.

As another example, the conductive resin composition of the present invention includes 100 parts by weight of a base resin (A), which includes a polyester, a polyarylene ether, and an aromatic elastomer; 3 to 12 parts by weight of two or more polyfunctional reaction agents (B); 0.1 to 3 parts by weight of carbon nanotubes (C); and 0.1 to 5 parts by weight of carbon nanoplates (D). In this case, the conductive resin composition has a water absorption rate of 0.1% or less. Furthermore, the conductive resin composition has excellent moisture stability and heat resistance in addition to excellent appearance, rigidity, and conductivity, is capable of minimizing the influence of moisture and heat when exposed to external environments, and thus, can be used in exterior parts to replace metal parts used in automobiles.

Hereinafter, each component of the conductive resin composition of the present invention will be described in detail.

(A) Base Resin

Polyester

The polyester of the present invention preferably includes one or more selected from a polyalkylene terephthalate, a poly(ester)urethane, and a polyether ester, and, more preferably, a polyalkylene terephthalate. In this case, appearance and electromagnetic wave shielding performance may be excellent.

As a specific example, the polyalkylene terephthalate may include one or more selected from the group consisting of polyethylene terephthalate, polypropylene terephthalate, and polybutylene terephthalate, preferably polybutylene terephthalate. In this case, appearance and electromagnetic wave shielding performance may be excellent.

For example, the polybutylene terephthalate may be obtained through polymerization, wherein the polymerization includes esterification of butane-1,4-diol and terephthalic acid or transesterification of butane-1,4-diol and dimethyl terephthalate.

The polyester resin is preferably a copolymer or homopolymer containing 70% to 100% by weight of an alkylene terephthalate as a repeating unit.

The weight ratio of a repeating unit in a resin or copolymer may be calculated by converting the repeating unit into a monomer, or the weight ratio of a monomer added during polymerization of the resin or the copolymer.

For example, the alkylene terephthalate copolymer may be obtained by transesterification of 70% to 100% by weight, preferably 70% to 99% by weight of butylene terephthalate and 0% to 30% by weight, preferably 1% to 30% by weight of ethylene terephthalate or propylene terephthalate.

Based on the content of the base resin, the polyester is preferably included in an amount of 30% to 80% by weight, more preferably 40% to 70% by weight, still more preferably 50% to 70% by weight. Within these ranges, all of conductivity, appearance, and moisture stability may be excellent.

The polyester preferably has a melt index (MI) (250° C., 2.16 kg) of 5 g/10 min to 50 g/10 min, more preferably 10 g/10 min to 40 g/10 min, still more preferably 15 g/10 min to 35 g/10 min, still more preferably 20 g/10 min to 30 g/10 min. Within these ranges, conductivity, heat resistance, and electromagnetic wave shielding performance may be excellent.

For example, the polyester may be a chemically-modified polyester, preferably a modified polyalkylene terephthalate, more preferably a modified polybutylene terephthalate. In this case, impact strength may be further improved.

For example, the chemical modification may be performed by copolymerizing a major monomer, such as an alkylene terephthalate, and one or more selected from the group consisting of polytetramethylene glycol (PTMG), polypropylene glycol (PPG), polyethylene glycol (PEG), a low molecular weight aliphatic polyester, and a low molecular weight aliphatic polyamide as comonomers.

Unless specified otherwise, methods commonly used in the art to which the present invention pertains may be used as a method of preparing a polyester without particular limitation. For example, interfacial polymerization, melt condensation polymerization, solution condensation polymerization, or transesterification may be used.

Polyarylene Ether

The polyarylene ether of the present invention is preferably polyphenylene ether (PPE), and as a specific example, may include one or more selected from the group consisting of poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, poly(2,3,6-trimethyl-1,4-phenylene)ether, poly(2,3,6-triethyl-1,4-phenylene)ether, and copolymers thereof, preferably poly(2,6-dimethyl-1,4-phenylene) or a copolymer thereof.

Based on the content of the base resin, the polyarylene ether is preferably included in an amount of 15% to 60% by weight, more preferably 20% to 55% by weight, still more preferably 25% to 50% by weight, still more preferably 30% to 40% by weight. In this case, heat resistance and mechanical strength may be excellent.

The polyarylene ether copolymer means a polymer prepared by co-polymerizing a major monomer and a comonomer, and as a specific example, may be selected from a copolymer of poly(2,6-dimethyl-1,4-phenylene)ether and poly(2,3,6-trimethyl-1,4-phenylene)ether; a copolymer of poly(2,6-dimethyl-1,4-phenylene)ether and poly(2,3,6-triethyl-1,4-phenylene)ether; and combinations thereof. As a preferred example, the polyarylene ether copolymer is a copolymer of poly(2,6-dimethyl-1,4-phenylene)ether and poly(2,3,6-trimethyl-1,4-phenylene)ether.

The polyarylene ether preferably has an intrinsic viscosity of 0.2 dl/g to 0.8 dl/g, more preferably 0.3 dl/g to 0.6 dl/g, still more preferably 0.3 dl/g to 0.4 dl/g as measured at 25° C. in chloroform as a solvent. Within these ranges, heat resistance, processability, and appearance may be excellent while maintaining mechanical properties at a high level.

The polyarylene ether is preferably in the form of flakes. In this case, mechanical properties, such as impact strength and flexural strength, processability, and appearance may be excellent.

In this description, as the polyphenylene oxide in the form of flakes, a commercially available product may be used as long as it meets the definition of the present invention. Alternatively, the polyphenylene oxide may be prepared by a method commonly used in the art to which the present invention pertains, but the present invention is not limited thereto.

In this description, a flake means a flake-shaped particle including a wide range of scales and granules, and as a specific example, may be a scale having a depth of 1 μm to 20 μm and a length of 0.05 mm to 1 mm. As another example, the flake may be a granule having a ratio (L/D) of length to depth of 1.5 to 500, preferably 2 to 100, more preferably 10 to 50.

In this description, the depth and length of the flake may be measured by microscopic analysis.

Aromatic Elastomer

The aromatic elastomer of the present invention is preferably a styrene-based rubber. As a specific example, the aromatic elastomer may include one or more selected from styrene-butadiene-styrene (SBS) copolymers, styrene-ethylene-butylene-styrene (SEBS) copolymers, styrene-butadiene (SB) copolymers, styrene-isoprene (SI) copolymers, styrene-isoprene-styrene (SIS) copolymers, alpha-methyl-styrene-butadiene copolymers, styrene-ethylene-propylene copolymers, styrene-ethylene-propylene-styrene copolymers, styrene-(ethylene-butylene/styrene copolymer)-styrene copolymers, and modified polymers thereof. As a preferred example, the aromatic elastomer may include one or more selected from the group consisting of styrene-butadiene-styrene (SBS) copolymers, styrene-ethylene-butylene-styrene (SEBS) copolymers, and maleic anhydride-modified styrene-ethylene-butylene-styrene copolymers, as a more preferred example, a styrene-butadiene-styrene (SBS) copolymer. In this case, mechanical properties, such as impact strength, and conductivity may be excellent.

Based on the content of the base resin, the aromatic elastomer is preferably included in an amount of 1% to 30% by weight, more preferably 1% to 20% by weight, still more preferably 3% to 15% by weight, still more preferably 5% to 10% by weight. Within these ranges, in addition to mechanical properties and conductivity, appearance and moisture stability may be excellent.

In the aromatic elastomer, the content of an aromatic vinyl compound-derived structural unit is preferably 20% to 40% by weight, more preferably 20% to 30% by weight. Within these ranges, mechanical properties may be excellent.

In the aromatic elastomer, the content of rubber is preferably 60% to 80% by weight, more preferably 70% to 80% by weight. Within these ranges, mechanical properties may be excellent.

As a method of preparing the aromatic elastomer, methods commonly used in the art to which the present invention pertains may be used without particular limitation. As a specific example, emulsion polymerization, suspension polymerization, solution polymerization, or bulk polymerization may be used. As a preferred example, emulsion polymerization or bulk polymerization may be used.

(B) Two or More Polyfunctional Reaction Agents

The polyfunctional reaction agents of the present invention preferably include two or more functional groups selected from the group consisting of a carboxyl group, an amine group, a hydroxyl group, a maleic acid group, and an epoxy group. As a specific example, the polyfunctional reaction agents may include 2 to 5 functional groups selected therefrom. In this case, conductivity and moisture stability may be excellent.

In this description, as the maleic acid group, a substituent recognized as a maleic acid group in the art to which the present invention pertains may be used without particular limitation. As a specific example, the maleic acid group means a functional group derived from maleic acid or maleic anhydride.

As a specific example, the polyfunctional reaction agents may be a polymer functionalized by reacting a polyphenylene ether and a reactive monomer, such as an unsaturated carboxylic acid or anhydride thereof.

For example, the reactive monomer may include one or more selected from the group consisting of citric acid, maleic acid, itaconic acid, fumaric acid, acrylic acid, and anhydrides thereof.

In this description, "two or more types" means two or more polyfunctional reaction agents having different types or structures.

As a specific example, the two or more polyfunctional reaction agents preferably consist of a combination of one high molecular weight polyfunctional reaction agent having a number average molecular weight of 150,000 g/mol or more and a low molecular weight polyfunctional reaction agent having a number average molecular weight of 10,000 g/mol or less.

Based on 100 parts by weight in total of the base resin, the two or more polyfunctional reaction agents are preferably included in an amount of 3 parts to 12 parts by weight, more preferably 5 parts to 12 parts by weight, still more preferably 5 parts to 10 parts by weight. Within these ranges, appearance, conductivity, and moisture stability may be greatly improved without deteriorating the intrinsic mechanical properties of a resin.

The two or more polyfunctional reaction agents preferably include a polyphenylene oxide resin functionalized with a carboxylic acid, maleic acid, or maleic anhydride; and a bisphenol A type epoxy resin having an epoxy functional group at end thereof. In this case, conductivity and moisture stability may be excellent.

Based on 100 parts by weight in total of the base resin, the polyphenylene oxide resin functionalized with a carboxylic acid, maleic acid, or maleic anhydride is preferably included in an amount of 1 to 10 parts by weight, more preferably 2 to 8 parts by weight, still more preferably 3 to 8 parts by weight. Within these ranges, appearance and moisture stability may be greatly improved without deteriorating the intrinsic mechanical properties of a resin.

Based on 100 parts by weight in total of the base resin, the bisphenol A type epoxy resin is preferably included in an amount of 0.5 parts to 8 parts by weight, more preferably 1 part to 7 parts by weight, still more preferably 1 part to 5 parts by weight. Within these ranges, appearance, conductivity, and moisture stability may be greatly improved without deteriorating the intrinsic mechanical properties of a resin.

The bisphenol A type epoxy resin preferably has an average epoxy equivalent of 2,000 to 6,000 and/or a number average molecular weight of 3,000 g/mol to 10,000 g/mol and/or a glass transition temperature of 50° C. to 120° C., and/or is preferably a solid at room temperature. Within these ranges, appearance and moisture stability may be greatly improved without deteriorating the intrinsic mechanical properties of a resin.

In this description, number average molecular weight may be measured through gel permeation chromatography (GPC, Waters Breeze).

In this description, glass transition temperature (Tg) may be measured using a Pyris 6 DSC (Perkin Elmer Co.).

In this description, the average epoxy equivalent is average molecular weight per one epoxy group.

The weight of the polyphenylene oxide resin functionalized with a carboxylic acid, maleic acid, or maleic anhydride is preferably not less than that of the bisphenol A type epoxy resin. More preferably, the weight of the polyphenylene oxide resin is greater than that of the bisphenol A type epoxy resin. Still more preferably, the weight of the polyphenylene oxide resin is at least 5 times the weight of the bisphenol A type epoxy resin. In this case, heat resistance and moisture stability may be excellent.

In this description, within the scope of the present invention, the polyfunctional reaction agents may be prepared by a method commonly practiced in the art to which the present invention pertains, or commercially available products may be used as the polyfunctional reaction agents, without particular limitation.

(C) Carbon Nanotubes

The carbon nanotubes of the present invention preferably have a BET surface area of 180 m$^2$/g to 600 m$^2$/g, more preferably 180 m$^2$/g to 400 m$^2$/g, still more preferably 180 m$^2$/g to 300 m$^2$/g, still more preferably 200 m$^2$/g to 300 m$^2$/g. Within these ranges, processability and conductivity may be greatly improved.

In this description, the BET surface area may be measured using a nitrogen adsorption method. As a specific example, the BET surface area may be measured by a BET 6-point method according to a nitrogen gas adsorption/distribution method using pore distribution measuring instrument (Porosimetry analyzer, Belsorp-II mini, Bell Japan Inc.). As another example, the BET surface area may be measured by a Brunauer, Emmett, or Teller method according to ASTM 6556.

Based on 100 parts by weight in total of the base resin, the carbon nanotubes are preferably included in an amount of 0.1 part to 3 parts by weight, more preferably 0.1 part to 2 parts by weight, still more preferably 0.1 part to 1.5 parts by weight, still more preferably 0.3 parts to 1.5 parts by weight, most preferably 0.5 parts to 1.3 parts by weight. Within these ranges, in addition to processability and conductivity, mechanical properties, appearance and heat resistance may be excellent.

For example, the carbon nanotubes may include one or more selected from the group consisting of single-walled carbon nanotubes (SWCNTs), double-walled carbon nanotubes (DWCNTs), and multi-walled carbon nanotubes (MWCNTs).

For example, the carbon nanotubes may be bundle-type (rope-type) nanotubes or non-bundle-type (entangle-type) nanotubes.

In this description, as the "bundle-type" and the "non-bundle-type", "bundle-type" and a "non-bundle-type" nanotubes, respectively, commonly approved or defined in the art to which the present invention pertains may be used without particular limitation.

The carbon nanotubes preferably have an average diameter of 5 nm to 30 nm, more preferably 7 nm to 20 nm, still more preferably 10 nm to 15 nm. Within these ranges, conductivity and appearance may be greatly improved.

In this description, a measurement method commonly practiced in the art to which the present invention pertains may be used to measure the average diameter of the carbon nanotubes without particular limitation. As a specific example, the average diameter of the carbon nanotubes may be measured by electron microscopy analysis.

(D) Carbon Nanoplates

The carbon nanoplates of the present invention are preferably plate-shaped carbon nanoplates, more preferably plate-shaped carbon nanoplates having an average thickness of 5 nm to 50 nm. Within this range, due to mutual dispersion effect with the above-described carbon nanotubes, the conductivity, mechanical properties, heat resistance, and moisture stability of the base resin may be greatly improved.

The carbon nanoplates preferably include one or more selected from exfoliated graphite, graphene nanoplates, and exfoliated expanded graphite, more preferably exfoliated graphite. Due to mutual dispersion effect of the above-described carbon nanotubes, the conductivity, mechanical properties, heat resistance, and moisture stability of the base resin may be greatly improved.

For example, the exfoliated graphite may be graphite obtained by processing layered graphite to have a thickness of 5 nm to 50 nm using a chemical and/or physical exfoliation method.

Exfoliation methods commonly practiced in the art to which the present invention pertains may be used as the method of chemically and/or physically exfoliating layered graphite, without particular limitation. As a specific example, graphite may be modified and expanded using Brodie's method, Hummers' method, or the like, and then may be exfoliated by ultrasonic crushing, rapid heating, or the like.

Based on 100 parts by weight in total of the base resin, the carbon nanoplates are preferably included in an amount of 0.1 part to 5 parts by weight, more preferably 0.5 parts to 5 parts by weight, still more preferably 0.5 parts to 3 parts by weight, still more preferably 1 part to 3 parts by weight, most preferably 2 parts to 3 parts by weight. Within these ranges, due to mutual dispersion effect of the above-described carbon nanotubes, the conductivity, mechanical properties, and moisture stability of the base resin may be greatly improved.

The carbon nanoplates preferably have an average thickness of 5 nm to 40 nm, more preferably 10 nm to 40 nm. Within these ranges, due to mutual dispersion effect of the above-described carbon nanotubes, conductivity and appearance may be improved at the same time.

In this description, measurement methods commonly used in the art to which the present invention pertains may be used to measure the average thickness of the carbon nanoplates, without particular limitation. As a specific example, electron microscopy analysis may be used.

(E) Glass Powder

The glass powder of the present invention is preferably a spherical glass powder having an average diameter of 10 µm to 90 µm.

In this description, without particular limitation, "spherical glass powder" may be glass powder having a shape recognized or defined as a spherical shape in the art to which the present invention pertains, such as a bead. For example, the spherical glass powder may be glass beads.

The glass powder preferably has an average diameter of 15 µm to 70 µm, more preferably 20 µm to 50 µm. Within these ranges, due to mutual dispersion effect between the carbon nanotubes and the carbon nanoplates described above, the conductivity, mechanical properties, and heat resistance of the base resin may be improved.

In this description, methods commonly used in the art to which the present invention pertains may be used to measure the average diameter of the glass powder, without particular limitation. For example, light microscope analysis or light scattering analysis may be used.

Based on 100 parts by weight in total of the base resin, the glass powder is preferably included in an amount of 1 part to 7 parts by weight, more preferably 1 part to 6 parts by weight, still more preferably 2 parts to 6 parts by weight, still more preferably 2 parts to 5 parts by weight. Within these ranges, heat resistance and mechanical properties may be greatly improved without degrading other physical properties.

For example, the glass powder may include one or more selected from the group consisting of E glass powder, D glass powder, L glass powder, M glass powder, S glass powder, T glass powder, NE glass powder, quartz glass powder, short glass powder, and hollow glass powder.

For example, in a particle size distribution, the glass powder may have a 90% particle diameter (D90) of 20 µm to 120 µm, preferably 25 µm to 100 µm. Within these ranges, heat resistance and mechanical properties may be greatly improved without degrading other physical properties.

For example, in a particle size distribution, the glass powder may have a 50% particle diameter (D50) of 10 µm to 50 µm, preferably 20 µm to 50 µm. Within these ranges, heat resistance and mechanical properties may be greatly improved without degrading other physical properties.

For example, the glass powder may include 50% to 75% by weight, preferably 60% to 72% by weight of PbO; 2% to 30% by weight, preferably 2% to 20% by weight of $B_2O_3$; 2% to 35% by weight, preferably 5% to 30% by weight of $SiO_2$; and 0% to 20% by weight or 0.1% to 20% by weight, preferably 0% to 10% by weight or 0.1% to 10% by weight of ZnO+CaO. Within these ranges, conductivity and mechanical properties may be excellent.

As another example, the glass powder may include 30% to 55% by weight, preferably 40% to 50% by weight of PbO; 10% to 40% by weight, preferably 15% to 35% by weight of $B_2O_3$; 1% to 15% by weight, preferably 2% to 10% by weight of $SiO_2$; 0% to 30% by weight, preferably 10% to 30% of ZnO; and 0% to 30% by weight, preferably 3% to 20% by weight of $BaO+CaO+Bi_2O_3$. Within these ranges, conductivity and mechanical properties may be excellent.

As another example, the glass powder may include 40% to 70% by weight, preferably 40% to 60% by weight of ZnO; 20% to 40% by weight, preferably 20% to 35% by weight of $B_2O_3$; 5% to 20% by weight, preferably 5% to 15% by weight of $SiO_2$; and 2% to 30% by weight, preferably 2% to 20% by weight of $Na_2O+K_2O+Li_2O$. Within these ranges, conductivity and mechanical properties may be excellent.

As another example, the glass powder may include 25% to 45% by weight, preferably 30% to 40% by weight of ZnO; 15% to 40% by weight, preferably 20% to 35% by weight of $Bi_2O_3$; 10% to 30% by weight, preferably 15% to 25% by weight of $B_2O_3$; 0.5% to 8% by weight, preferably 1% to 6% by weight of $SiO_2$; and 8% to 24% by weight, preferably 10% to 20% by weight of CaO+SrO+BaO. Within these ranges, conductivity and mechanical properties may be excellent.

Conductive Resin Composition

The conductive resin composition of the present invention preferably has a heat distortion temperature of 180° C. or higher, more preferably 185° C. or higher or 186° C. higher, still more preferably 190° C. or higher, as a specific example, 180° C. to 200° C., as a preferred example, 185° C. to 200° C., as a more preferred example, 190° C. to 200° C. Within these ranges, physical property balance, moisture stability, conductivity, and appearance may be excellent.

The conductive resin composition preferably has a water absorption rate of 0.1% or less, 0.10% or less, or 0.09% or less, more preferably 0.08% or less, still more preferably 0.07% or less, still more preferably 0.06% or less, as a specific example, 0.05% to 0.09%, as a preferred example, 0.05% to 0.08%, as a more preferred example, 0.05% to 0.07%. Within these ranges, physical property balance, heat resistance, conductivity, and appearance may be excellent.

The conductive resin composition preferably has a surface resistance of $10^{\wedge 8}$ ohm/sq or less, more preferably $10^{\wedge 7}$ ohm/sq or less, as a specific example, $10^{\wedge 6}$ ohm/sq to $10^{\wedge 8}$ ohm/sq. Within these ranges, physical property balance, heat resistance, moisture stability, and appearance may be excellent.

The conductive resin composition preferably has a tensile strength of 55 MPa or more, more preferably 60 MPa or more, as a specific example, 55 MPa to 70 MPa, as a preferred example, 60 MPa to 70 MPa, as measured under conditions of a specimen thickness of 3.2 mm and a measurement speed of 5 mm/min according to ASTM D638. Within this range, physical property balance, heat resistance, conductivity, moisture stability, and appearance may be excellent.

The conductive resin composition preferably has a notched Izod impact strength of 18 J/m or more, more preferably 130 J/m or more, as a specific example, 100 J/m to 280 J/m, as a preferred example, 130 J/m to 280 J/m, as measured under conditions of a specimen thickness of 4 mm and a measurement temperature of 25° C. according to ISO 180A. Within these ranges, physical property balance, heat resistance, conductivity, moisture stability, and appearance may be excellent.

Method of Preparing Conductive Resin Composition

The method of preparing a conductive resin composition according to the present invention preferably includes a step of kneading and extruding 100 parts by weight of a base resin (A), which includes a polyester, a polyarylene ether, and an aromatic elastomer; 3 parts to 12 parts by weight of two or more polyfunctional reaction agents (B); 0.1 part to 3 parts by weight of carbon nanotubes (C); 0.1 part to 5 parts by weight of carbon nanoplates (D); and 1 part to 7 parts by weight of glass powder (E). In this case, the kneading and extrusion are performed using an extruder equipped with 9 or more kneading blocks. In this case, there is an advantage of providing a conductive resin composition having excellent moisture stability and heat resistance in addition to excellent appearance, rigidity, and conductivity; capable of minimizing the influence of moisture and heat when exposed to external environments due to these properties; and thus, suitable for use in exterior parts to replace metal parts used in automobiles.

As another example, the conductive resin composition of the present invention includes a step of kneading and extruding 100 parts by weight of a base resin (A), which includes a polyester, a polyarylene ether, and an aromatic elastomer; 3 parts to 12 parts by weight of two or more polyfunctional reaction agents (B); 0.1 part to 3 parts by weight of carbon nanotubes (C); and 0.1 part to 5 parts by weight of carbon nanoplates (D). In this case, the kneading and extrusion are performed using an extruder equipped with or more kneading blocks, and the conductive resin composition has a water absorption rate of 0.1% or less. Furthermore, in addition to appearance, rigidity, and conductivity, moisture stability and heat resistance may be excellent, thereby minimizing the influence of heat when exposed to external environments. Thus, there is an advantage of providing a conductive resin composition suitable for use in exterior parts to replace metal parts used in automobiles.

For example, the kneading and extrusion may be performed at a barrel temperature of 230° C. to 310° C., preferably 240° C. to 300° C., more preferably 250° C. to 290° C., still more preferably 250° C. to 280° C. In this case, throughput per unit time may be high, melt-kneading may be sufficiently performed, and thermal decomposition of resin components may be prevented.

For example, the kneading and extrusion may be performed at a screw rotation rate of 100 rpm to 500 rpm, preferably 150 rpm to 400 rpm, more preferably 100 rpm to 350 rpm, still more preferably 150 rpm to 320 rpm, still more preferably 200 rpm to 310 rpm. Within these ranges, throughput per unit time may be high, process efficiency may be excellent, and excessive cutting of carbon nanotubes and carbon nanoplates may be prevented, thereby improving the conductivity of a final product.

The conductive resin composition obtained by the kneading and extrusion may be provided in a pellet form.

A method of preparing a molded article according to the present invention preferably includes a step of preparing conductive resin composition pellets by kneading and extruding 100 parts by weight of a base resin (A), which includes a polyester, a polyarylene ether, and an aromatic elastomer; 3 parts to 12 parts by weight of two or more polyfunctional reaction agents (B); 0.1 part to 3 parts by weight of carbon nanotubes (C); 0.1 part to 5 parts by weight of carbon nanoplates (D); and 1 part to 7 parts by weight of glass powder (E), and a step of preparing a molded article by injecting the prepared pellets. In this case, the kneading and extrusion are performed using an extruder equipped with 9 or more kneading blocks. In this case, in addition to appearance, rigidity, and conductivity, moisture stability and heat resistance may be excellent, thereby providing a molded article in which the influence of moisture and heat when exposed to external environments is minimized.

The injection may be performed using a method and conditions commonly used in the art to which the present invention pertains, without particular limitation.

In describing the conductive resin composition, the molded article, the method of preparing the conductive resin composition, and the method of manufacturing the molded article, unless specified otherwise, other conditions (for example, the configuration and specifications of an extruder and an injection machine, extrusion and injection conditions, additives, and the like) may be appropriately selected and implemented as needed when the conditions are within the range commonly practiced in the art, without particular limitation.

Hereinafter, the present invention will be described with reference to the FIGURE.

The FIGURE is a schematic illustration of an extruder equipped with 9 or more kneading blocks for preparing the conductive resin composition of the present invention.

The type of extruder is not particularly limited, and an extruder commonly used in the art may be appropriately selected and used. For example, a single-screw extruder equipped with one screw or a multi-screw extruder equipped with a plurality of screws may be used. Considering uniform kneading of materials, ease of processing, and economic efficiency, a twin-screw extruder equipped with two screws is preferably used.

The extruder includes a raw material feeder for feeding materials into a barrel, a screw for conveying and kneading the fed materials, and a die for extruding the kneaded materials. In this case, the screw consists of a plurality of screw elements for various functions.

In the extruder, one or more raw material feeders may be provided, and two or more raw material feeders may be provided, as needed. In addition, a main inlet may be provided, and two or more auxiliary inlets may be optionally provided.

As a specific example, the base resin, the polyfunctional reaction agents, the carbon nanotubes, the carbon nanoplates, and the glass powder may be fed into the main inlet batch wise. As another example, the base resin and the polyfunctional reaction agents may be fed into the main inlet, and then the carbon nanotubes, the carbon nanoplates, and the glass powder may be fed into the auxiliary inlets. As a preferred example, components other than the polyester may be fed into the main inlet, and the polyester may be fed into the auxiliary inlets.

As another example, the base resin and the polyfunctional reaction agents may be fed into the main inlet, some of the carbon nanotubes, the carbon nanoplates, and the glass powder may be fed into the auxiliary inlet 1, and then the remainder may be fed into the auxiliary inlet 2.

As another example, the base resin may be fed into the main inlet, the carbon nanotubes, the carbon nanoplates, and the glass powder may be fed into the auxiliary inlet 1, and the polyfunctional reaction agents may be fed into the auxiliary inlet 2.

The kneading blocks of the present invention correspond to the screw elements. Specifically, each kneading block consists of a plurality of discs, preferably 3 to 7 discs, 5 to 7 discs, 3 to 5 discs, or 4 to 5 discs, and has a polygonal cross section or an elliptical cross section. The kneading blocks are arranged continuously in a direction in which materials are conveyed. In addition, in the kneading block, the phase angle of the discs (indicating the travel angle between discs) is preferably 45° to 90°.

In addition, the kneading block includes a forward kneading block capable of conveying, distributing, and mixing materials, a neutral kneading block capable of distributing and mixing materials without conveying the same, and a backward kneading block capable of conveying materials in a direction opposite to the conveying direction.

For example, the conductive concentrated resin composition according to the present invention may be prepared using a method including a step of performing kneading and extrusion using an extruder equipped with 9 or more, preferably 10 or more, more preferably 12 or more kneading blocks, as a preferred example, 9 to 18 kneading blocks, as a more preferred example, 10 to 18 kneading blocks, as a still more preferred example, 12 to 16 kneading blocks. In this case, it may be effective to arrange the kneading blocks in the order of forward kneading blocks, neutral kneading blocks, and backward kneading blocks with respect to a resin flow direction. Depending on the manner of combination, a continuous or separate block combination may be used. In this case, the dispersibility of a conductive filler and compatibility between compositions may be further improved, and thus a high-quality conductive resin composition may be provided.

9 or more kneading blocks may be arranged continuously, or may be arranged discontinuously between screws. As a specific example, 3 to 6 kneading blocks may be provided continuously between the main inlet and the auxiliary inlet 1, 3 to 8 kneading blocks may be provided continuously between the auxiliary inlet 1 and the auxiliary inlet 2, and 2 to 5 kneading blocks may be provided between the auxiliary inlet 2 and an outlet (not shown). With this configuration, local heat generation during melt-kneading may be controlled to prevent thermal deformation of raw materials. In addition, excessive cutting of nanoscale components may be prevented, thereby preventing deterioration of conductivity and physical properties.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Components used in Examples and Comparative Examples below are as follows.

Polyester: CP2000 (MI: 30 g/10 min, LG Chemical Co.) was used as a polybutylene terephthalate.
Polyarylene ether: A 040 product (Bluestar Co.) was used as a polyphenylene oxide resin (PPO).
Polyamide: A 3602 PA66 product (Invista Co.) was used.
Aromatic elastomer: An SBS501 product (styrene content: 30% by weight, butadiene rubber content: 70% by weight, LG Chemical Co.) was used as a styrene-based rubber.
Polyfunctional reaction agent 1: A ZA product (G Farm Co.) of a polyphenylene oxide (mah-PPO) structure modified with maleic anhydride was used.
Polyfunctional reaction agent 2: A reactive epoxy YD019 product (epoxy equivalent: 2,000 to 3,000, Kukdo Chemical Co.) was used.
Carbon nanotubes: A CP1002M product (LG Chemical Co.) having a BET surface area of 200 $m^2$/g to 300 $m^2$/g was used.
Plate-shaped carbon nanoplates: A layered exfoliated product having an average thickness of 5 nm to 50 nm was used.
Glass powder: A Mircopearl GB product (Sovitec Co.) having an average diameter of 50 μm was used as spherical glass powder.

Examples 1 to 6 and Comparative Examples 1 to 10

Components of various components were mixed in the amounts shown Tables 1 and 2, and were melt-kneaded and extruded at a temperature 250° C. to 310° C. and a rotation rate (rpm) of 300 revolutions/min using a twin-screw extruder equipped with 10 mixing blocks (T40, SM Co.) to prepare pellets, and the prepared pellets were injected using an injection machine (80 tons, Engel Co.) to prepare specimens for evaluation.

The twin-screw extruder has a total of two or more inlets. Components other than the polyester were fed into a main inlet, and the polyester was fed into the auxiliary inlets.

Test Examples

The properties of specimens prepared in Examples 1 to 6 and Comparative Examples 1 to 10 were measured according to the following methods, and the results are shown in Tables 1 and 2 below.

Tensile strength (MPa): Using a specimen having a thickness of 3.2 mm, tensile strength was measured at a measurement rate of 5 mm/min according to ASTM D638.
Impact strength(J/m): A specimen having a thickness of 4 mm was notched, and the Notched Izod impact strength of the specimen was measured at a room temperature (23° C.) according to ISO 180A.
Heat distortion temperature (° C.): The heat distortion temperature of a specimen having a thickness of 4 mm was measured under a stress of 0.45 MPa according to ISO 75-2.
Surface resistance (Ohm/sq): The surface resistance of an injection specimen was measured using a PRS-801 (Prostat Co.).
Surface quality (appearance): The appearance of an injection specimen was evaluated by the naked eye as follows: ⊚: Excellent both in moldability and appearance, o: Good both in moldability and appearance, Δ: Good appearance (Pinholes were rarely observed), X: Deterioration in appearance (Pinholes were observed), and XX: Poor appearance (Pinholes and flow marks were observed).
Water absorption rate (%): A flat specimen having a size of 100 mm×100 mm×3 mm was prepared by performing injection using an injection machine (80 tons, Engel Co.). The specimen was immersed in distilled water at 40° C. for 72 hours, and the increased weight thereof was measured in % by weight.

TABLE 1

| Classification | Examples | | | | | |
|---|---|---|---|---|---|---|
| | 1 | 2 | 3 | 4 | 5 | 6 |
| Polyester | 60 | 60 | 50 | 50 | 50 | 60 |
| Polyamide | — | — | — | — | — | — |
| Polyarylene ether | 35 | 35 | 40 | 40 | 40 | 35 |
| Aromatic elastomer | 5 | 5 | 10 | 10 | 10 | 5 |
| Polyfunctional reaction agent 1 | 4 | 7 | 7 | 5 | 2 | 7 |
| Polyfunctional reaction agent 2 | 1 | 3 | 2 | 2 | 5 | 3 |
| Carbon nanotubes | 1 | 1 | 1 | 0.5 | 1 | 1 |
| Carbon nanoplates | 2 | 2 | 2 | 3 | 3 | 3 |
| Glass powder | 4 | 2 | 3 | 5 | 5 | — |
| Tensile strength (MPa) | 60 | 60 | 65 | 60 | 64 | 62 |
| Impact strength (J/m) | 130 | 140 | 170 | 250 | 225 | 145 |
| Heat distortion temperature (° C.) | 190 | 193 | 187 | 190 | 182 | 191 |
| Surface resistance (Ohm/sq) | $10^{\wedge 8}$ | $10^{\wedge 7}$ | $10^{\wedge 7}$ | $10^{\wedge 8}$ | $10^{\wedge 7}$ | $10^{\wedge 8}$ |
| Surface quality (appearance) | ⊚ | ⊚ | ○ | ○ | ○ | ⊚ |
| Water absorption rate (%) | 0.06 | 0.08 | 0.07 | 0.07 | 0.09 | 0.08 |

TABLE 2

| Classification | Comparative Examples | | | | | | | | | |
|---|---|---|---|---|---|---|---|---|---|---|
| | 1 | 2 | 3 | 4 | 5 | 6 | 7 | 8 | 9 | 10 |
| Polyester | 60 | 60 | — | — | 60 | 60 | 60 | 60 | 60 | 60 |
| Polyamide | — | — | 50 | 60 | — | — | — | — | — | — |
| Polyarylene ether | 35 | 35 | 40 | 30 | 35 | 35 | 35 | 35 | 35 | 35 |
| Aromatic elastomer | 5 | 5 | 10 | 10 | 5 | 5 | 5 | 5 | 5 | 5 |
| Polyfunctional reaction agent 1 | 8 | — | 7 | 7 | 7 | — | 5 | 4 | 4 | 1 |
| Polyfunctional reaction agent 2 | — | 4 | 2 | 2 | 2 | 1 | — | 1 | 1 | 1 |
| Carbon nanotubes | 1 | — | — | 3 | 4 | 1 | 1 | — | 1 | 1 |
| Carbon nanoplates | — | 3 | 2 | 2 | 1 | 1 | 1 | 1 | — | 6 |
| Glass powder | 2 | 5 | — | — | — | 4 | 4 | 4 | 4 | — |
| Tensile strength (MPa) | 40 | 50 | 60 | 60 | 53 | 45 | 47 | 56 | 55 | 50 |
| Impact strength (J/m) | 250 | 100 | 200 | 210 | 65 | 50 | 60 | 90 | 80 | 60 |
| Heat distortion temperature (° C.) | 180 | 175 | 170 | 168 | 177 | 185 | 180 | 185 | 180 | 173 |
| Surface resistance (Ohm/sg) | $10^{\wedge 12}$ | $10^{\wedge 12}$ | $10^{\wedge 13}$ | $10^{\wedge 8}$ | $10^{\wedge 8}$ | $10^{\wedge 9}$ | $10^{\wedge 10}$ | $10^{\wedge 13}$ | $10^{\wedge 11}$ | $10^{\wedge 9}$ |
| Surface quality (appearance) | XX | X | Δ | X | X | X | X | Δ | Δ | X |
| Water absorption rate (%) | 0.11 | 0.11 | 1.50 | 2.10 | 0.12 | 0.12 | 0.12 | 0.12 | 0.11 | 0.12 |

As shown in Tables 1 and 2, compared to the conductive resin compositions (Comparative Examples 1 to 10) outside the range of the present invention, the conductive resin compositions (Examples 1 to 6) according to the present invention exhibit mechanical properties, such as tensile strength, equal or superior to those of the conductive resin compositions of Comparative Examples 1 to 10. In addition, in the case of the conductive resin compositions of Examples 1 to 6, heat distortion temperature and surface resistance are greatly improved, and surface quality and water absorption rate are excellent.

The invention claimed is:

1. A conductive resin composition, comprising:
   100 parts by weight of a base resin (A) comprising a polyester, a polyarylene ether, and an aromatic elastomer;
   3 to 12 parts by weight of two or more polyfunctional reaction agents (B);
   0.1 to 3 parts by weight of carbon nanotubes (C);
   0.1 to 5 parts by weight of carbon nanoplates (D); and
   1 to 10 parts by weight of a glass powder (E),
   wherein the aromatic elastomer includes one or more selected from the group consisting of styrene-butadiene-styrene (SBS) copolymers, styrene-ethylene-butylene-styrene (SEBS) copolymers, and maleic anhydride-modified styrene-ethylene-butylene-styrene copolymers,
  wherein each of the two or more polyfunctional reaction agents comprises two or more functional groups selected from the group consisting of a carboxyl group, an amine group, a hydroxyl group, a maleic acid group, and an epoxy group, and
  wherein the two or more polyfunctional reaction agents comprise a polyphenylene oxide resin functionalized with a carboxylic acid, maleic acid, or maleic anhydride; and a bisphenol A type epoxy resin.

2. The conductive resin composition according to claim 1, wherein the base resin comprises 30% to 80% by weight of the polyester, 15% to 60% by weight of the polyarylene ether, and 1% to 30% by weight of the aromatic elastomer.

3. The conductive resin composition according to claim 1, wherein the polyester is polybutylene terephthalate.

4. The conductive resin composition according to claim 1, wherein the carbon nanotubes have a BET surface area of 180 to 600 m$^2$/g.

5. The conductive resin composition according to claim 1, wherein the carbon nanoplates are plate shaped.

6. The conductive resin composition according to claim 1, wherein the carbon nanoplates have an average thickness of 5 nm to 50 nm.

7. The conductive resin composition according to claim 1, wherein the glass powder is a spherical glass powder having an average diameter of 10 μm to 90 μm.

8. The conductive resin composition according to claim 1, wherein the conductive resin composition has a heat distortion temperature of 180° C. or higher.

9. The conductive resin composition according to claim 1, wherein the conductive resin composition has a surface resistance of $10^8$ or less.

10. A molded article, comprising the conductive resin composition according to claim 1.

11. The molded article according to claim 10, wherein the molded article is an electrostatically coated exterior part for automobiles.

* * * * *